United States Patent
Ishikawa

(10) Patent No.: US 7,492,721 B2
(45) Date of Patent: Feb. 17, 2009

(54) TRAFFIC MEASUREMENT DEVICE AND TRAFFIC MEASUREMENT METHOD

(75) Inventor: Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 853 days.

(21) Appl. No.: 10/438,939

(22) Filed: May 16, 2003

(65) Prior Publication Data

US 2003/0214915 A1 Nov. 20, 2003

(30) Foreign Application Priority Data

May 20, 2002 (JP) .............................. 2002-145388

(51) Int. Cl.
*H04L 12/26* (2006.01)
(52) U.S. Cl. .................... 370/252; 455/423; 455/453
(58) Field of Classification Search .................. 370/252
See application file for complete search history.

(56) References Cited

U.S. PATENT DOCUMENTS 6,192,249 B1 * 2/2001 Padovani ..................... 455/453
6,760,567 B1 * 7/2004 Jeong et al. ............... 455/67.11

FOREIGN PATENT DOCUMENTS

| EP | 0 889 663 | 1/1999 |
|---|---|---|
| EP | 1 079 646 | 2/2001 |
| EP | 1 156 696 | 11/2001 |
| EP | 1156696 A2 * | 11/2001 |
| JP | 8-191481 | 7/1996 |
| JP | 2000-115073 | 4/2000 |
| JP | 2001-217786 | 8/2001 |
| JP | 2001-320756 | 11/2001 |
| JP | 2002-112302 | 4/2002 |
| JP | 2002-333458 | 11/2002 |
| WO | WO 98/30057 | 7/1998 |
| WO | WO 01/80581 | 10/2001 |

OTHER PUBLICATIONS

Yoshihiro Ishikawa, et al., B-5-31, p. 416, "Estimation Method of Interference Power Distribution and Call Blocking Rate in W-CDMA Reverse Link", Mar. 2000.
Fujii, et al., NTT DoCoMo Technical Journal, vol. 2, No. 4, pp. 28-34, "Cell Design System for Mobile Communications", Jan. 1995.
Ohmatsuzawa, et al., NTT DoCoMo Technical Journal, vol. 4, No. 1, pp. 28-31, "Total Support System for Base Station Design", Apr. 1996.
Yoshihiro Ishikawa, et al., B-5-31, pp. 1-3, "Estimation Method of Interference Power Distribution and Call Blocking Rate in W-CDMA Reverse Link", Mar. 2000 ( English translation only ).
Fujii, et al., NTT DoCoMo Technical Journal, vol. 2, No. 4, 1 page, "Cell Design System for Mobile Communications", Jan. 1995 ( partial English translation only ).
Ohmatsuzawa, et al., NTT DoCoMo Technical Journal, vol. 4, No. 1, pp. 1-2, "Total Support System for Base Station Design", Apr. 1996 ( partial English translation only ).

* cited by examiner

*Primary Examiner*—Rafael Pérez-Gutiérrez
*Assistant Examiner*—German Viana Di Prisco
(74) *Attorney, Agent, or Firm*—Oblon, Spivak, McClelland, Maier & Neustadt, P.C.

(57) ABSTRACT

A traffic measurement device comprises a noise power setting unit configured to set a reference noise power, which is a reference value used to measure a traffic volume at a base station, a noise power measurement unit configured to measure a noise power at the base station, and a calculation unit configured to calculate the traffic volume based on the reference noise power and the measured noise power. Another traffic measurement device comprises a transmission power setting unit configured to set a reference transmission power, which is a reference value used to measure the traffic volume at a base station, a transmission power measurement unit configured to measure a transmission power at the base station, and a calculation unit configured to calculate the traffic volume based on the reference transmission power and the measured transmission power.

14 Claims, 6 Drawing Sheets

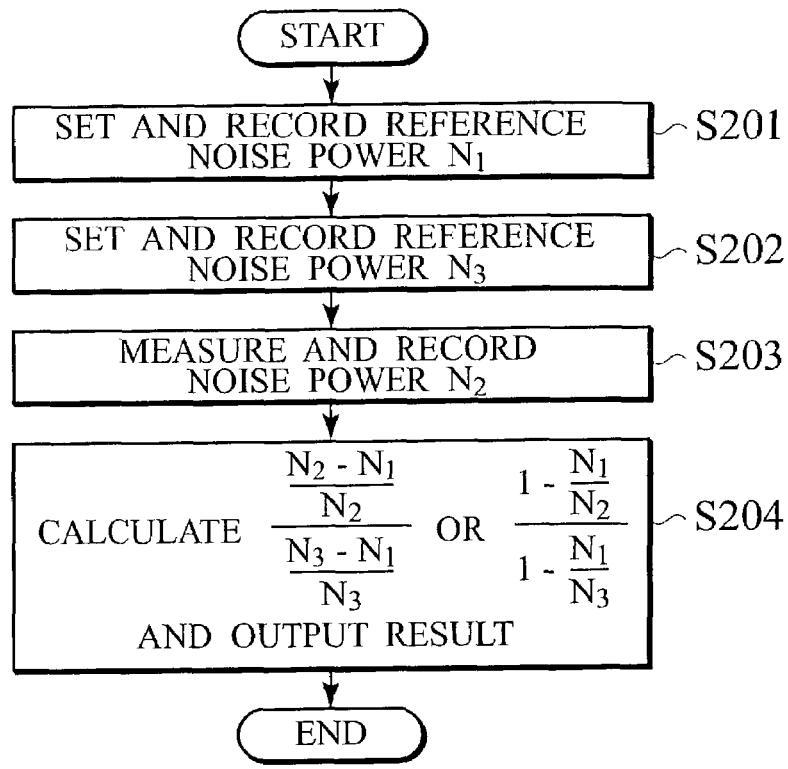
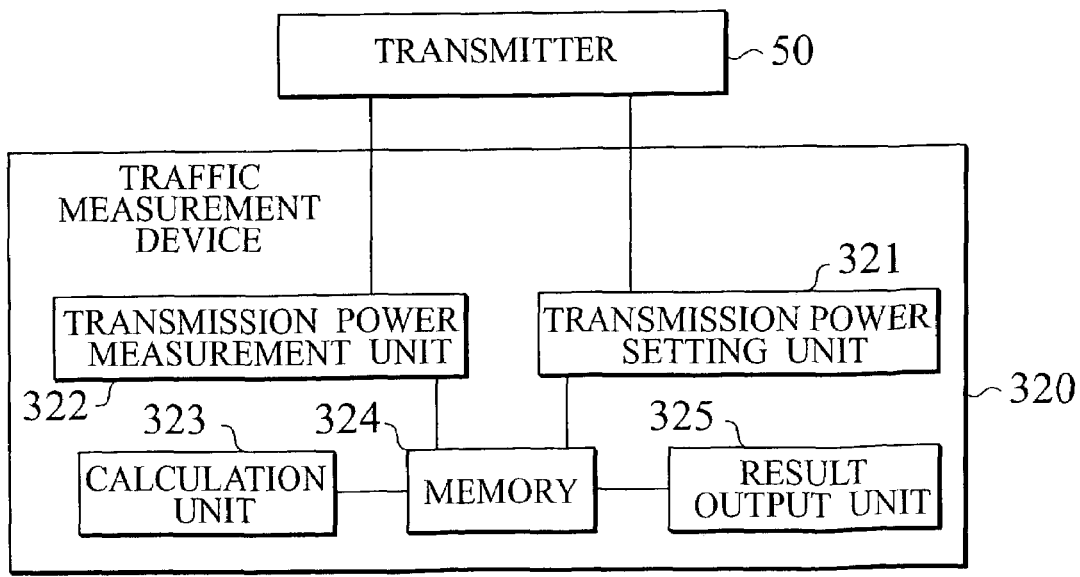

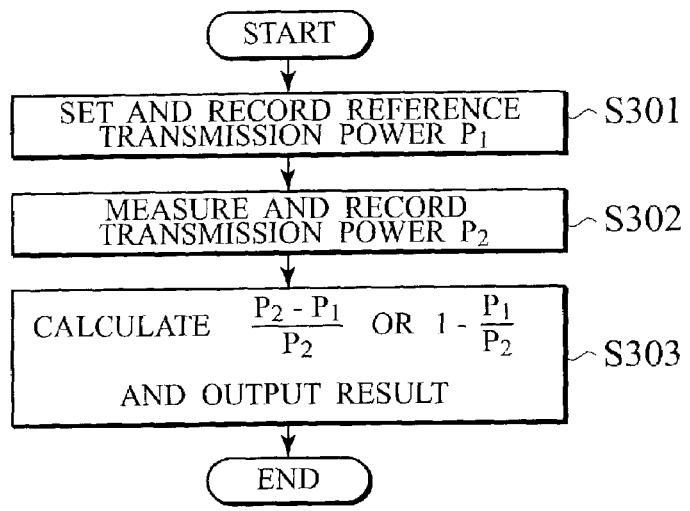
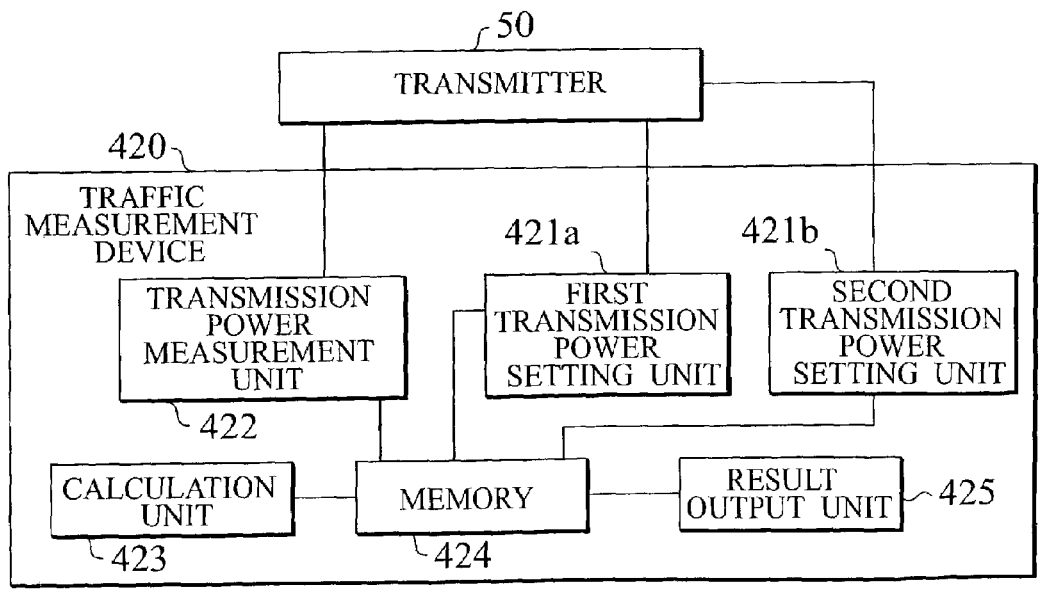

TRAFFIC MEASUREMENT DEVICE AND TRAFFIC MEASUREMENT METHOD

CROSS REFERENCE TO RELATED APPLICATIONS

This application is based upon and claims the benefit of priority from the prior Japanese Patent Application No. P2002-145388, filed on May 20, 2002; the entire contents of which are incorporated herein by reference.

BACKGROUND OF THE INVENTION

1. Field of the Invention

The present invention relates to a traffic measurement device, which measures traffic volume at a base station that communicates by connecting a radio link with a mobile station using code division multiple access and a traffic measurement method.

2. Description of the Related Art

Mobile communication systems widely used at present provide a mobile communication service with the entire service area divided into radio zones that are referred to as cells. This type of mobile communication system includes a plurality of base stations that cover the cells, and mobile stations that communicate by connecting radio links with these base stations. The scale of the equipment provided at each base station differs depending on the traffic volume of the cell covered by that base station. Accordingly, system engineers designing mobile communication system design base station equipment by closely estimating traffic demand.

Conventionally, before base stations are placed, system engineers estimated the traffic demand at each base station based on, for example, the population of the district in which the base station is to be placed or the type of district, namely whether it is a commercial zone or residential zone, or the like. Furthermore, after the base stations are actually placed and mobile communication service has started, system engineers measured how many users are using each base station, namely, the actual traffic volume at each base station. System engineers then decided whether to expand or scale down the equipment provided at each base station based on the measured actual traffic volume.

For example, in a mobile communication system adopting a frequency division multiple access (FDMA) or time division multiple access (TDMA) as the multiple access where radio links connect the base stations and mobile stations, the actual traffic volume was grasped by counting the number of connected radio links (number of channels).

On the other hand, in a called third generation mobile communication system that uses code division multiple access (hereafter referred to as CDMA) as the multiple access, each base station observes communication carried out at neighboring base stations as interference. Thus, the traffic volume at a base station is the sum of the number of mobile stations actually connected to the base station (hereafter referred to as the actual number of users), which can be determined from the number of radio links (number of channels) connected between the base station and the mobile stations, and the number determined by converting the interference volume from the neighboring base stations into the number of radio links (number of channels) connected between the base station and the mobile stations, namely, the number of mobile stations connected to the base station (hereafter referred to as the converted number of users). In other words, in the case of using CDMA, the traffic volume at a base station is not defined only by the actual number of users determined from the number of radio links, but is also subject to the communication conditions of the neighboring base stations.

Consequently, at a base station using CDMA, whether a new call is received or not is determined according to the assumption that the interference volume at the base station corresponds to the traffic volume on the uplink and that the transmission power at the base station corresponds to the traffic volume on the downlink (Japanese Patent Application Laid-open No. Hei. 8-191481, International Publication No. WO98/30057).

Furthermore, it has been verified through computer simulation that the corrected value of the interference volume on the uplink of a base station using CDMA corresponds to the traffic volume (Ishikawa and Iwamura, "Estimation Method of Interference Power Distribution and Call Blocking Rate in W-CDMA Reverse link", 2000 The Institute of Electronics, Information and Communication Engineers General Conference, B-5-31, March 2000).

In addition, to design a mobile communication system in consideration of radio wave propagation, a technique of estimating the radio wave propagation conditions of the service area by simulating the radio wave propagation based on the specifications of the base stations or mobile stations or topographical data using a computer may also be used (Fujii, Asakura, and Yamazaki, "Cell Design System for Mobile Communications", NTT DoCoMo Technical Journal Vol. 2, No. 4, pp. 28-34, January 1995, and Ohmatsuzawa and Yamashita, "Total Support System for Base Station Design", NTT DoCoMo Technical Journal Vol. 4, No. 1, pp. 28-31, April 1996). With this technique, data such as altitude data, topographical data, or traffic volume is stored for each minutely divided area, and the signal-to-noise power ratio (SNR) at each reception point or the traffic volume at each base station is calculated based thereto.

However, the method of assuming that the interference volume at a base station on the uplink and the transmission power at the base station on the downlink respectively correspond to the traffic volume had the following problems. Though the interference volume or transmission power corresponded to the traffic volume so that the traffic volume increased if the interference volume or transmission power increased, this value was not directly proportional to the actual number of users, and thus was not the actual traffic volume itself. Accordingly, the traffic volume could not be accurately grasped from the interference volume or transmission power, and the load tasked to the base station by the increasing traffic volume (hereafter referred to as the traffic load) could not be adequately grasped.

Furthermore, with the method of determining the value that corresponds to the traffic volume by correcting the interference volume on the uplink of the base station using CDMA through computer simulation, the reception power per mobile station had to be measured and the entire limit capacity needed to be grasped in advance. Essentially, there were many parameters difficult to ascertain. Accordingly, since the traffic volume itself could not be accurately grasped and the traffic volume could not be easily determined with this method, actual utilization was difficult. In addition, this method could not be used to determine the value that corresponds to that traffic volume on the downlink. The technique of estimating the radio wave propagation of the service area was also not capable of grasping the accurate traffic volume itself at a base station and estimating the traffic load. Furthermore, various data needed to be stored, and the traffic volume could not be easily determined.

BRIEF SUMMARY OF THE INVENTION

An objective of the present invention is to easily determine an accurate traffic volume at a base station that communicates using CDMA, and to adequately evaluate the traffic load at the base station.

A traffic measurement device comprises a noise power setting unit configured to set a reference noise power, which is a reference value used to measure a traffic volume at a base station that connects a radio link and communicates with a mobile station using CDMA, a noise power measurement unit configured to measure a noise power at the base station, and a calculation unit configured to calculate the traffic volume based on the reference noise power and the measured noise power.

The traffic volume is the sum of the actual number of users, which is the number of radio links (number of channels) connected between the base station and mobile stations, namely, the number of mobile stations actually connected to the base station, and the converted number of users, which is determined by converting the interference volume from the neighboring base stations into the number of radio links (number of channels) that are connected between the base station and the mobile stations, namely, the number of mobile stations connected to the base station. It should be noted that the traffic volume is not just the sum of the actual number of users and the converted number of users, but also includes all data indicating the conditions of the sum of the actual number of users and the converted number of users, where the mode of expression thereof is not particularly limited. Examples of such data are the ratio of the maximum number of mobile stations that can be connected to a base station with radio links (hereafter referred to as the capacity limit) to the sum of the actual number of users and the converted number of users, the difference of the sum of the actual number of users and the converted number of users from the reference value, the value is directly proportional to the sum of the actual number of users and the converted number of users, and the like. Furthermore, the noise power refers to the sum of the thermal noise power of the receiver itself in a base station that receives radio signals from a mobile station, and the interference noise power from all mobile stations. This noise power is the called interference volume at the base station.

With this type of traffic measurement device, the noise power setting unit sets the reference noise power, which is a reference value used to measure the traffic volume. The noise power measurement unit measures the actual noise power at the base station. The calculation unit then calculates the traffic volume based on not only the actually measured noise power but also the reference noise power, which is a reference value. Thus, the traffic measurement device can determine the actual noise power conditions in relation to the reference noise power, and can determine the accurate traffic volume at the base station. Accordingly, the traffic load conditions on an uplink of a base station that communicates using CDMA can be adequately evaluated with the traffic measurement device. In addition, the traffic measurement device can easily determine the traffic volume by simply setting the reference noise power and the measuring the actual noise power.

Furthermore, another traffic measurement device comprises a transmission power setting unit configured to set a reference transmission power, which is a reference value used to measure a traffic volume at a base station that connects a radio link and communicates with a mobile station using CDMA, a transmission power measurement unit configured to measure a transmission power at the base station, and a calculation unit configured to calculate the traffic volume based on the reference transmission power and the measured transmission power.

With this type of traffic measurement device, the transmission power setting unit sets the reference transmission power, which is a reference value used to measure the traffic volume. The transmission power measurement unit measures the actual transmission power at the base station. The calculation unit then calculates the traffic volume based on not only the actually measured transmission power but also the reference transmission power, which is a reference value. Thus, the traffic measurement device can determine the actual transmission power conditions for the reference transmission power, and can determine the accurate traffic volume at the base station. Accordingly, the traffic load conditions on a downlink of the base station that communicates using CDMA can be adequately evaluated with the traffic measurement device. In addition, the traffic measurement device can easily determine the traffic volume by simply setting the reference transmission power and measuring the actual transmission power.

BRIEF DESCRIPTION OF THE SEVERAL VIEWS OF THE DRAWINGS

FIG. 7 is a flow diagram illustrating a traffic measurement method procedure according to the second embodiment of the present invention;

FIG. 8 is a block diagram illustrating the configuration of a traffic measurement device according to a third embodiment of the present invention;

FIG. 9 is a flow diagram illustrating a traffic measurement method procedure according to the third embodiment of the present invention;

FIG. 10 is a block diagram illustrating the configuration of a traffic measurement device according to a fourth embodiment of the present invention; and.

DETAILED DESCRIPTION OF THE INVENTION

First Embodiment

Figure 1:
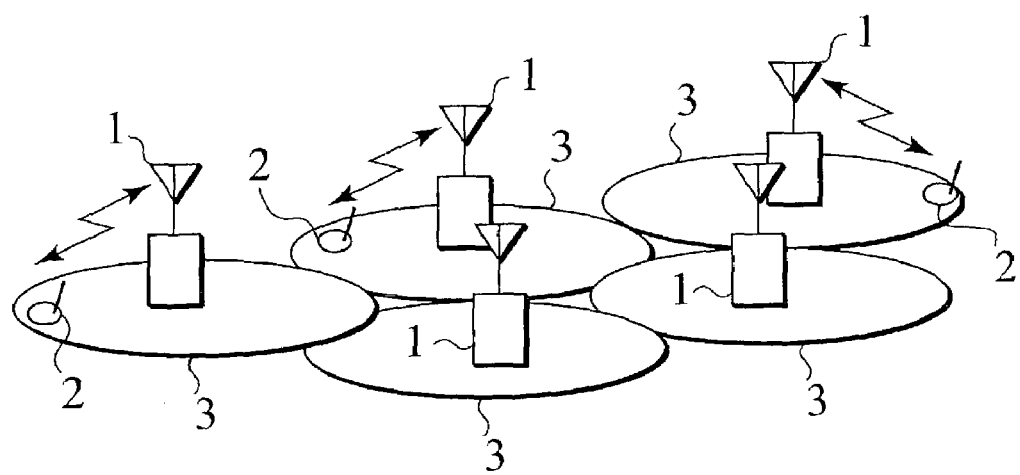
FIG. 1 is a diagram illustrating the configuration of a mobile communication system according to a first embodiment of the present invention.

As shown in FIG. 1, a mobile communication system provides a mobile communication service using cells 3, which result from dividing the entire service area that provides the mobile communication service into a number of radio zones.

This type of mobile communication system includes a plurality of base stations 1, which cover the cells 3 and communicate with mobile stations 2 that exist in the cells 3, and the mobile stations 2, which communicate with these base stations 1. The base station 1, using CDMA, communicates by connecting a radio link with each mobile station 2 that exists in the cell 3 covered by that station itself.

(Traffic Measurement Device)

Figure 2:
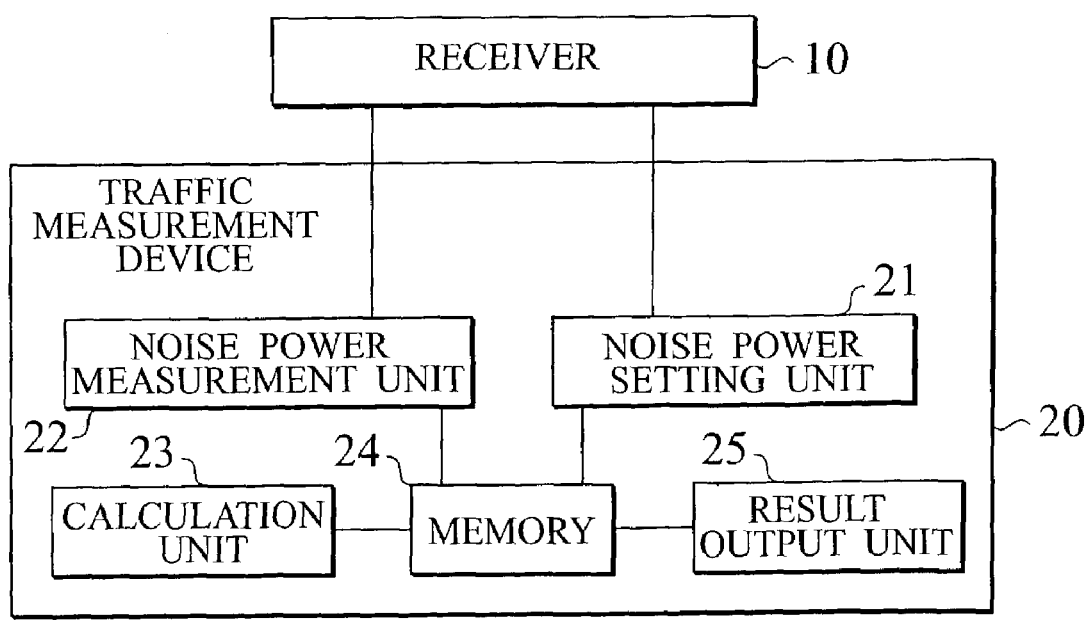
FIG. 2 is a block diagram illustrating the configuration of a traffic measurement device according to the first embodiment of the present invention.

A traffic measurement device 20 is provided in the base station 1. It should be noted that in the case of simulating traffic volume using the traffic measurement device 20, the traffic measurement device 20 need not be provided in the base station 1. As shown in FIG. 2, the traffic measurement device 20 is connected to a receiver 10. The receiver 10, which is the receiver of the base station 1, receives the radio signals transmitted from the mobile station 2. The traffic measurement device 20 comprises a noise power setting unit 21, a noise power measurement unit 22, a calculation unit 23, a memory 24, and a result output unit 25.

The noise power setting unit 21 sets a reference noise power $N_1$ at the base station 1, which is a reference value used to measure the traffic volume. The noise power setting unit 21 can set the noise power at the base station 1 when the traffic volume at the base station 1 is 0 as the reference noise power $N_1$.

In other words, the noise power setting unit 21 can set as the reference noise power $N_1$, the noise power at the base station 1 in a state where the base station 1 has not connected any radio links with the mobile station 2, no mobile station 2 exists in the cell 3 that is covered by the base station 1, and there is no interference among the mobile stations 2. Therefore the traffic measurement device 20 sets the reference noise power $N_1$ to a fixed value proper to each base station 1.

Furthermore, the noise power setting unit 21 can set the noise power at the base station at a previously determined time as the reference noise power $N_1$. The time may be determined to a certain time or certain time period. For example, the time may be determined to a randomly selected time such as 6:00 AM every morning, a time or period of time when the base station 1 is available, or a time or period of time when the base station 1 is busy or the like. The base station 1 being available means that only a few mobile stations 2 are connected to the base station 1, whereas the base station 1 being busy means that many mobile stations 2 are connected to the base station 1. A system engineer can examine in advance the change in the number of mobile stations 2 connected to the base station 1 as time passes and grasp the times when the base station 1 is busy or the periods of time when it is available so as to determine the time.

In addition, the noise power setting unit 21 can set the noise power at the base station 1 when the traffic volume at the base station 1 is an acceptable upper limit as the reference noise power $N_1$. In other words, the noise power setting unit 21 can set as the reference noise power $N_1$, the noise power at the base station 1 in the state where mobile stations 2 corresponding to the acceptable upper limit at the base station 1 exist in the cell 3 that is covered by the base station 1 and radio links are connected with the base station 1. It should be noted that the acceptable upper limit is determined by the system engineer, for example. Therefore the traffic measurement device 20 sets the reference noise power $N_1$ to a fixed value proper to each base station 1.

The noise power setting unit 21 is connected to the receiver 10 as shown in FIG. 2. Thus, the noise power setting unit 21 can measure the noise power at the receiver 10 when the traffic volume is 0, at the previously determined time, or when the traffic volume is the upper limit, and can set that measured noise power as the reference noise power $N_1$.

Furthermore, the noise power setting unit 21 can also set the noise power provided by the system engineer to the reference noise power $N_1$. In addition, the noise power setting unit 21 can simulate the noise power when the traffic volume is 0, at the previously determined time, or when the traffic volume is the upper limit, and can set that simulation result as the reference noise power $N_1$. The noise power setting unit 21 need not be connected to the receiver 10 as shown in FIG. 2 except when measuring the noise power of the receiver 10.

The noise power setting unit 21 may also set the reference noise power $N_1$ just once as the initial value. Furthermore, the noise power setting unit 21 may also periodically set and change the reference noise power $N_1$ at regular intervals, every day, every week or every month, or may appropriately set and change as necessary. The noise power setting unit 21 is connected to the memory 24. The noise power setting unit 21 records the set reference noise power $N_1$ in the memory 24.

The noise power measurement unit 22 measures a noise power $N_2$ at the base station 1. As described above, noise power refers to the sum of the thermal noise power of the receiver 10 itself at the base station 1, and the interference noise power from all the mobile stations 2, which is the called interference volume at the base station 1. The noise power measurement unit 22 is connected to the receiver 10 so as to measure the interference volume that the receiver 10 receives, as the noise power $N_2$.

The noise power measurement unit 22 measures the noise power $N_2$ when the traffic volume at the base station 1 is determined. Consequently, the noise power measurement unit 22 periodically or continuously measures the noise power $N_2$ in accordance with when the traffic measurement device 20 periodically or continuously measures the traffic volume. Furthermore, the noise power measurement unit 22 appropriately measures the noise power $N_2$ in accordance with when the traffic measurement device 20 randomly measures the traffic volume.

Furthermore, in a case where the traffic measurement device 20 simulates the traffic volume, the noise power measurement unit 22 measures the noise power $N_2$ by estimating the noise power $N_2$ when simulation of the traffic volume at the base station 1 is desired. In this case, the noise power measurement unit 22 need not be connected to the receiver 10. The noise power measurement unit 22 is connected to the memory 24, and records the measured noise power $N_2$ in the memory 24.

The calculation unit 23 calculates the traffic volume based on the reference noise power $N_1$ and the measured noise power $N_2$. The calculation unit 23 is connected to the memory 24, and reads the reference noise power $N_1$ and the measured noise power $N_2$ stored in the memory 24. The calculation unit 23 calculates the traffic volume by substituting the read reference noise power $N_1$ and noise power $N_2$ into the following formula (1) or formula (1)'.

$$\frac{N_2 - N_1}{N_2} \quad (1)$$

$$1 - \frac{N_1}{N_2} \quad (1)'$$

Formula (1)' is an equivalent modification of formula (1), and is essentially the same as formula (1). With formula (1) or formula (1)', if the noise power $N_2$ becomes greater than the reference noise power $N_1$, the traffic volume approaches gradually 1. On the contrary, if the noise power $N_2$ approaches the reference noise power $N_1$, the traffic volume approaches 0. Furthermore, if the noise power $N_2$ becomes less than the reference noise power $N_1$, the traffic volume becomes a negative value.

Accordingly, the noise power setting unit 21 setting the noise power when the traffic volume at the base station 1 is 0 as the reference noise power $N_1$ enables the traffic volume calculated by the calculation unit 23 using formula (1) or formula (1)' to become a value from 0 to 1. In this case, the calculation unit 23 may also convert the traffic volume to be expressed as a percentage by multiplying the value calculated with formula (1) or formula (1)' by 100. The degree of traffic load on the uplink at the base station 1 is apparent from the traffic volume expressed as a percentage. Accordingly, it is preferable to set the noise power when the traffic volume is 0 as the reference noise power $N_1$.

The calculation unit 23 records the traffic volume in the memory 24. The calculation unit 23 may either directly record in the memory 24 the traffic volume calculated by the formula (1) or formula (1)', or as described above, may record in the memory 24 the traffic volume that is converted to be expressed as a percentage.

The memory 24 stores the reference noise power $N_1$, noise power $N_2$, and traffic volume. The memory 24 is connected to the noise power setting unit 21, noise power measurement unit 22, calculation unit 23, and result output unit 25.

The result output unit 25 outputs the traffic volume. The result output unit 25 is connected to the memory 24, and reads and outputs the traffic volume that is stored in the memory 24. The result output unit 25 may either directly output the traffic volume stored in the memory 24 as a numerical value, or may create a graph based on that numerical value and output that created graph. Furthermore, the result output unit 25 may be configured to output not only the traffic volume but also the reference noise power $N_1$ and the noise power $N_2$.

Figure 3:
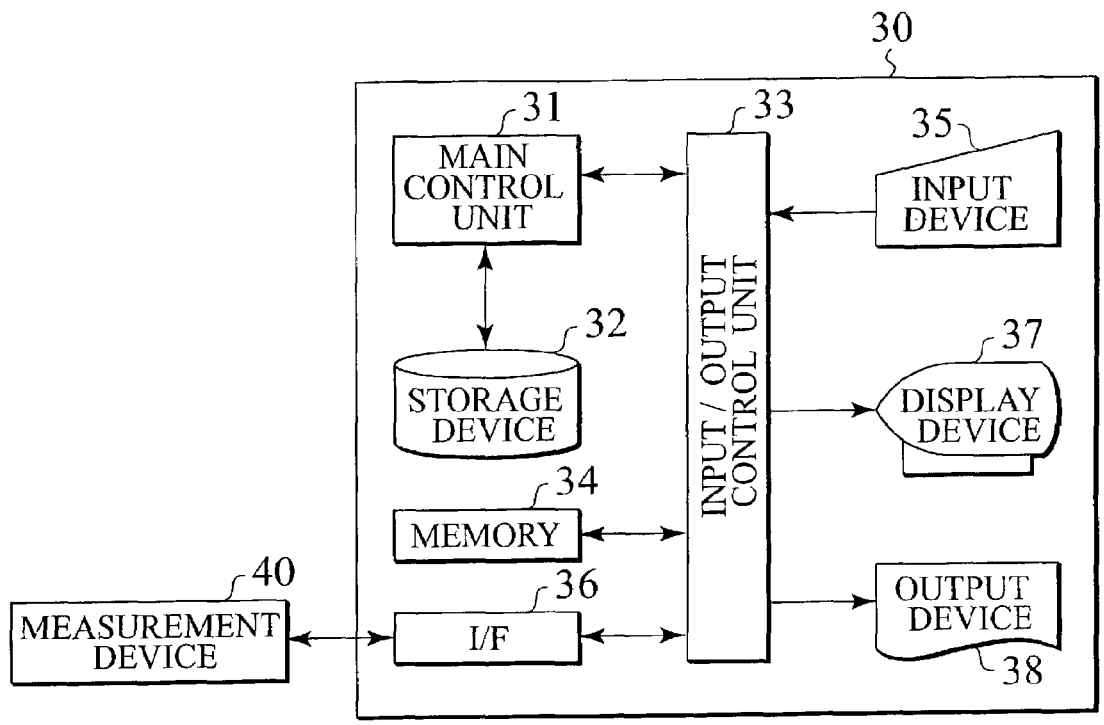
FIG. 3 is a diagram illustrating the hardware configuration of a traffic measurement device according to the first embodiment of the present invention.

This kind of traffic measurement device 20 can be configured from, for example, a computer 30 and a measurement device 40 as shown in FIG. 3. The computer 30, together with the measurement device 40, can then realize the traffic measurement device 20 by executing a traffic measurement program to set the reference noise power $N_1$ at the base station 1, obtain the noise power $N_2$ at the base station 1, and calculate the traffic volume based on the reference noise power $N_1$ and the noise power $N_2$.

The measurement device 40 is connected to the receiver 10 so as to measure the noise power of the receiver 10. Furthermore, the measurement device 40 is connected to the computer 30. The computer 30 comprises a main control unit 31, a storage device 32, an input/output control unit 33, a memory 34, an input device 35, an interface (hereafter referred to as I/F) 36, a display device 37, and an output device 38. Each component is connected via a bus or the like.

The above traffic measurement program is stored in the storage device 32. In other words, the storage device 32 is a recording medium in which the traffic measurement program is recorded. It should be noted that a recording medium is not limited to the storage device 32, where a removable medium, such as a CD-R, MO, or floppy disk may also be used. The main control unit 31 makes the main control unit 31 itself, input/output control unit 33, input device 35, I/F 36, display device 37, and output device 38 function as each unit of the traffic measurement device 20 by reading and executing the traffic measurement program from the storage device 32. It should be noted that the main control unit 31 may also read and execute the traffic measurement program from a medium external to the computer 30, such as from the above removable medium. A CPU, for example, may be used as the main control unit 31.

The input/output control unit 33 records in the memory 34 data input from the main control unit 31, input device 35, or I/F 36. Furthermore, the input/output control unit 33 retrieves the data stored in the memory 34, and inputs it to the main control unit 31, display device 37, or output device 38. The memory 34, similar to the memory 24, stores data such as the reference noise power $N_1$, noise power $N_2$, and traffic volume. The input device 35 inputs to the input/output control unit 33 data input by the system engineer, for example. A keyboard, for example, may be used as the input device 35.

The I/F 36 obtains the data from the measurement device 40 or an external device, such as an external removable medium, and inputs thereof to the input/output control unit 33. The display device 37 displays the numerical values or the graph input from the input/output control unit 33. A display or meter, for example, may be used as the display device 37. The output device 38 outputs the numerical values or the graph input from the input/output control unit 33 to a medium such as paper. A printer, for example, may be used as the output device 38.

The measurement device 40, I/F 36, and input/output control unit 33 function as the noise power setting unit 21 in the case where the measured noise power of the receiver 10 is set as the reference noise power $N_1$. Furthermore, the input device 35 and the input/output control unit 33, or the I/F 36 and the input/output control unit 33 function as the noise power setting unit 21 in the case where the noise power provided by the system engineer or the like is set as the reference noise power $N_1$, or in the case where the simulation result is set as the reference noise power $N_1$. In this case, the noise power provided by the system engineer or the like or the noise power used in simulation is input from the input device 35 or obtained from an external removable medium by the I/F 36 periodically or at the beginning as an initial value, and then recorded in the memory 34 by the input/output control unit 33.

The measurement device 40, I/F 36, and input/output control unit 33 function as the noise power measurement unit 22. Furthermore, in the case of simulating the traffic volume, the input device 35 and the input/output control unit 33, or the I/F 36 and the input/output control unit 33 function as the noise power measurement unit 22. In this case, the noise power, which is used in simulation and provided by the system engineer or the like, is input from the input device 35 or obtained from an external removable medium by the I/F 36, and then recorded in the memory 34 by the input/output control unit 33.

The main control unit 31 and the input/output control unit 33 function as the calculation unit 23. The display device 37 or output device 38 and the input/output control unit 33 function as the result output unit 25. It should be noted that in the case of creating a graph on the basis of the traffic volume stored in the memory 24 and outputting the created graph, the input/output control unit 33 makes a graph based on the traffic volume read from the memory 34, inputs thereof to the display device 37 or output device 38.

(Traffic Measurement Method)

Figure 4:
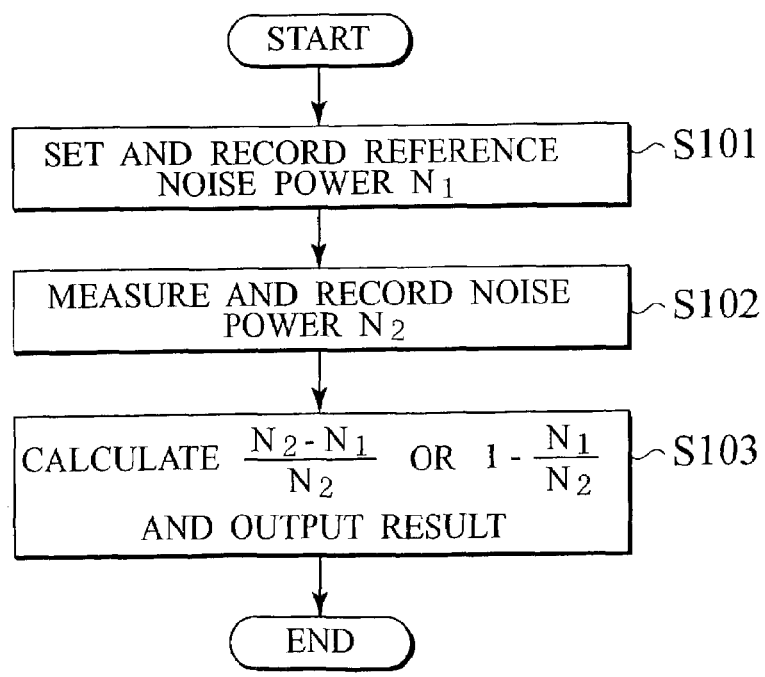
FIG. 4 is a flow diagram illustrating a traffic measurement method procedure according to the first embodiment of the present invention.

Next, a traffic measurement method using the above traffic measurement device 20 is described. As shown in FIG. 4, to begin with, the noise power setting unit 21 sets the reference noise power $N_1$ and records it in the memory 24 (S101). Next, the noise power measurement unit 22 measures the noise power $N_2$ and records it in the memory 24 (S102). The calculation unit 23 then calculates the traffic volume by reading the reference noise power $N_1$ and noise power $N_2$ from the memory 24, and substituting them into formula (1) or (1)'. The calculation unit 23 records the calculated traffic volume in the memory 24. Finally, the result output unit 25 reads and outputs the traffic volume from the memory 24 (S103).

It should be noted that step (S101) and step (S102) may also occur in reverse order. In other words, first the noise power measurement unit 22 may measure the noise power $N_2$, and then the noise power setting unit 21 may set the reference noise power $N_1$. Furthermore, in the case where the traffic measurement device 20 continuously or periodically measures the traffic volume, the reference noise power $N_1$ may also be set each time the traffic volume is measured by repeating step (S101) through step (S103). Alternatively, the traffic measurement device 20 may also set the reference noise power $N_1$ just once by performing step (S101) only the first time, and from the second time, repeat only steps (S102) and (S103). In other words, the traffic measurement device 20 may calculate the traffic volume by repeatedly measuring only the noise power $N_2$.

(Simulation)

Next, measurement of the traffic volume is simulated using the above traffic measurement device 20 and traffic measurement method. For simplification, simulation is performed for the case with no interference from other base stations 1 (interference from other cells). Furthermore, for comparison, simulation is carried out using formula (2) shown below, which has conventionally been used to evaluate traffic load.

Figure 5:
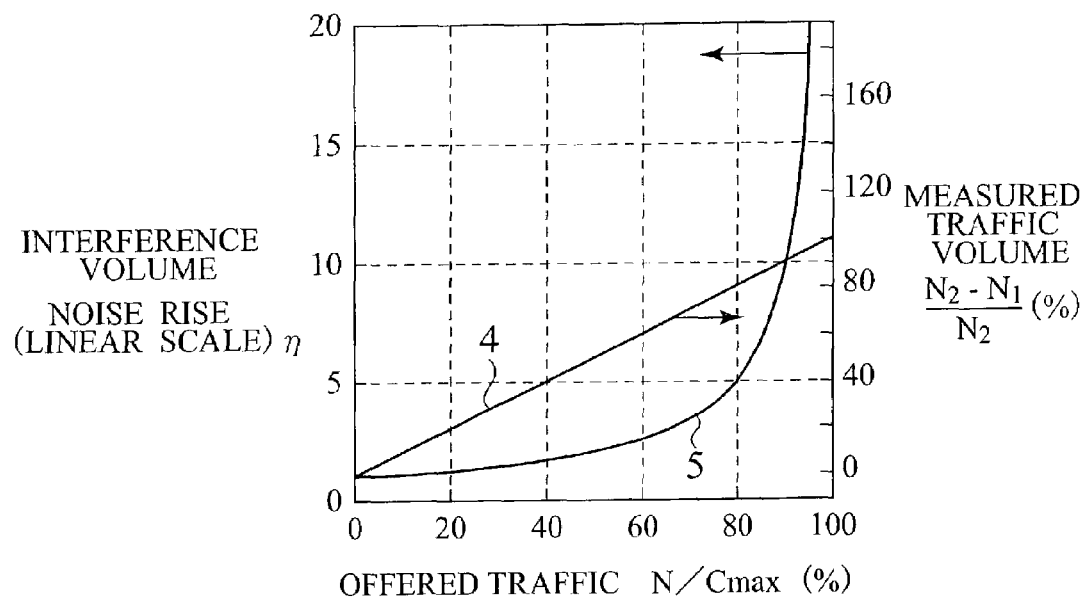
FIG. 5 is a graph illustrating traffic volume measurement simulation results according to the first embodiment of the present invention.

The horizontal axis in FIG. 5 represents $N/C_{max}$ (%). N is the actual number of users connected to the base station 1, and $C_{max}$ is the capacity limit of the base station 1. Accordingly, the horizontal axis of $N/C_{max}$ indicates the ratio of the number of users N to the capacity limit $C_{max}$. Furthermore, in FIG. 5, the left vertical axis represents the interference volume $\eta$, and the right vertical axis represents the traffic volume (%) that the traffic measurement device 20 measured.

A straight line 4 indicates the traffic volume (%) that the traffic measurement device 20 measured by setting the noise power when the traffic volume at the base station 1 is 0 as the reference noise power $N_1$, and multiplying the value calculated using formula (1) or formula (1)' by 100. The straight line 4 is plotted along the right vertical axis.

A curved line 5 indicates the interference volume $\eta$ determined by the following formula (2), and is plotted along the right vertical axis.

$$\eta = \frac{I_{all} + N_0 \cdot B}{N_0 \cdot B} \quad (2)$$

$I_{all}$ is the sum of the interference noise power from all the mobile stations 2, $N_0$ is the thermal noise power density of the receiver 10 itself, and B is the spread chip rate. As is apparent from FIG. 5, the straight line 4 that indicates the traffic volume measured by the traffic measurement device 20 is directly proportional to $N/C_{max}$. Thus, with the traffic measurement device 20, it is apparent that an accurate traffic volume is directly proportional to the actual number of users N at the base station 1 can be determined. Accordingly, with the traffic measurement device 20, it is apparent that the actual traffic load conditions at the base station 1 can be adequately evaluated.

On the other hand, the curved line 5 that indicates the interference volume $\eta$ is not directly proportional to $N/C_{max}$, therefore the interference volume $\eta$ is not directly proportional to the actual number of users N. Particularly, when the value of $N/C_{max}$ is small and the actual number of users N at the base station 1 are few, that is the traffic load is low, the interference volume $\eta$ is underestimated in comparison with the straight line 4 indicating the actual traffic volume. Accordingly, the actual traffic load conditions cannot be adequately evaluated.

Furthermore, $N/C_{max}$, which is the horizontal axis in FIG. 5 can be calculated from the following formula (3).

$$\frac{N}{C_{max}} = \frac{N}{\frac{Pg}{T} + 1} \quad (3)$$

T is $Eb/I_0$ necessary for communication, and Pg is the processing gain. In the case with no interference from other base stations 1 (interference from other cells), formula (3) can be expanded as shown in formula (4) with executing some mathematical operations.

$$\frac{N}{C_{max}} = \frac{N}{\frac{Pg}{T} + 1} = \frac{I_{all}}{I_{all} + N_0 \cdot B} = \frac{N_2 - N_1}{N_2} = 1 - \frac{N_1}{N_2} \quad (4)$$

It is also apparent from this formula (4) that formula (1) and formula (1)' represent accurate traffic volume that is directly proportional to the actual number of users N. It should be noted that although the interference noise power sum $I_{all}$ can be written separately from the thermal noise power density $N_0$ of the receiver 10 itself in the formula, these cannot be separately measured in practice. Only the noise power $N_2$, which is the sum of the thermal noise power of the receiver 10 itself and the interference noise power from all the mobile stations 2, can be measured.

With this type of traffic measurement device 20, traffic measurement method, and recording medium in which a traffic measurement program is recorded, the noise power setting unit 21 sets the reference noise power $N_1$, which is a reference value used to measure the traffic volume. The noise power measurement unit 22 measures the actual noise power $N_2$ at the base station 1. The calculation unit 23 then calculates the traffic volume based on not only the noise power $N_2$ actually measured but also the reference noise power $N_1$, which is a reference value. Thus, the traffic measurement device 20 can determine the degree of the actual noise power $N_2$ in relation to the reference noise power $N_1$, and can determine an accurate traffic volume at the base station 1.

Accordingly, as is apparent from FIG. 5, the traffic measurement device 20 can determine an accurate traffic volume reflected traffic load conditions on the uplink of the base station 1 that communicates using CDMA, and the traffic load conditions on the uplink of the base station 1 can be adequately evaluated. As a result, using the determined traffic volume, accurate equipment design for the base station 1 in the mobile communication system is possible.

Moreover, the traffic measurement device 20 can easily determine the traffic volume by simply setting the reference noise power $N_1$ and measuring the actual noise power $N_2$. In addition, the calculation unit 23 can determine an accurate traffic volume that is directly proportional to the actual number of users at the base station 1 as shown in FIG. 5 by calculating the traffic volume with formula (1) or formula (1)'. Thus, through calculation of a simple formula such as formula (1) or formula (1)', the traffic measurement device 20 can determine the traffic volume reflected traffic load conditions on the uplink of the base station 1.

Moreover, the noise power $N_2$ is a value usually measured at conventional base stations. Therefore, conventional base stations are usually capable of measuring the noise power $N_2$. Accordingly, the traffic measurement device 20 can easily determine the traffic volume by using the function currently used at the conventional base stations so as to use the measurable noise power $N_2$ without providing new function.

As described thus far, the traffic measurement device 20 is capable of easily and precisely estimating the traffic demand and the actual traffic volume on the uplink, which are extremely important in designing the equipment for the base station 1.

Second Embodiment (Traffic Measurement Device)

Figure 6:
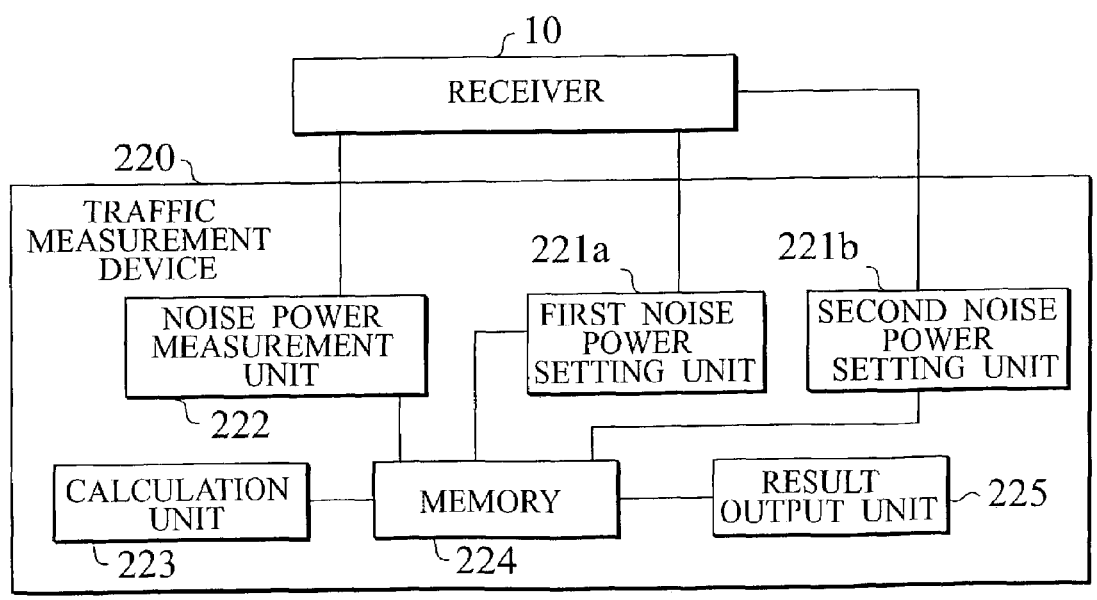
FIG. 6 is a block diagram illustrating the configuration of a traffic measurement device according to a second embodiment of the present invention.
Figure 11:
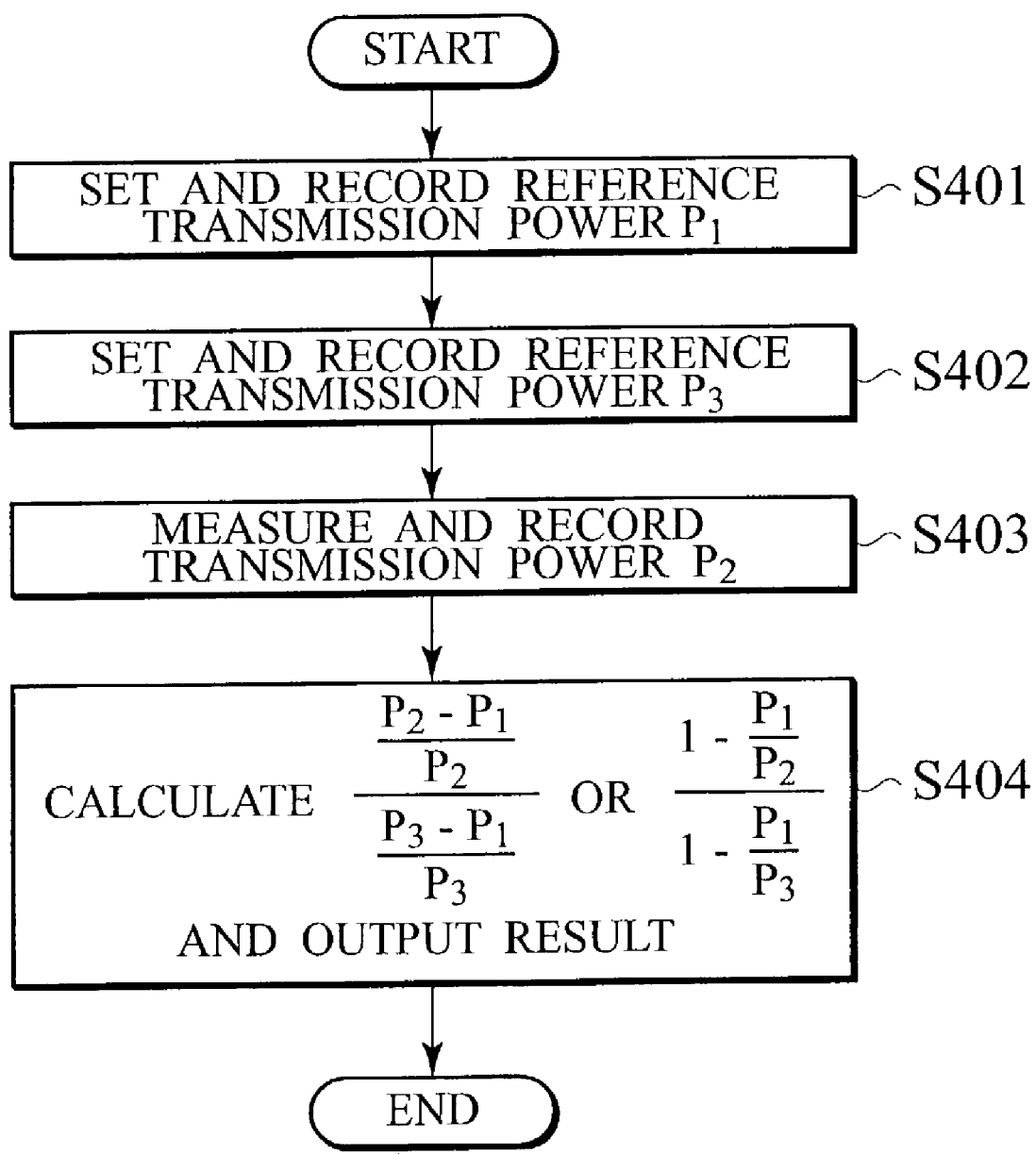
FIG. 11 is a flow diagram illustrating a traffic measurement method procedure according to the fourth embodiment of the present invention.

The mobile communication system may use a traffic measurement device 220 shown in FIG. 6 as the traffic measurement device. The traffic measurement device 220 is connected to the receiver 10. The traffic measurement device 220 comprises a first noise power setting unit 221a, a second noise power setting unit 221b, a noise power measurement unit 222, a calculation unit 223, a memory 224, and a result output unit 225. It should be noted that the noise power measurement unit 222 and the result output unit 225 are essentially the same as the noise power measurement unit 22 and result output unit 25 shown in FIG. 2.

The first noise power setting unit 221a and second noise power setting unit 221b function as the noise power setting unit that sets a plurality of reference noise powers at the base stations 1, which are reference values used to measure traffic volume. The traffic measurement device 220 sets two reference noise powers of which one is a reference noise power $N_1$ and the other is a reference noise power $N_3$. The first noise power setting unit 221a sets the reference noise power $N_1$. The second noise power setting unit 221b sets the reference noise power $N_3$.

The only rule for the reference noise power $N_1$ and reference noise power $N_3$ is that they are different values. Accordingly, similar to the noise power setting unit 21 shown in FIG. 2, the first noise power setting unit 221a and second noise power setting unit 221b can set noise powers different from each other as the reference noise power $N_1$ and reference noise power $N_3$ from among the noise power at the base station 1 when the traffic volume at the base station 1 is 0, the noise power at the base station 1 at a previously determined time, and the noise power at the base station 1 when the traffic volume is the acceptable upper limit at the base station 1.

However, it is preferable that the reference noise power $N_3$ is greater than the reference noise power $N_1$. Thus, it is preferable that the first noise power setting unit 221a sets as the reference noise power $N_1$ either the noise power at the base station 1 when the traffic volume at the base station 1 is 0, or the noise power at the previously determined time, for example, a time or period of time when the base station 1 is available. On the other hand, it is preferable that the second noise power setting unit 221b sets as the reference noise power $N_3$ either the noise power at the base station 1 when the traffic volume at the base station 1 is the acceptable upper limit thereat, or the noise power at the previously determined time, for example, a time or period of time when the base station 1 is busy.

Similar to the noise power setting unit 21 shown in FIG. 2, the first noise power setting unit 221a and the second noise power setting unit 221b, which are connected to the receiver 10, can measure the noise power of the receiver 10 and set that measured noise power as the reference noise power $N_1$ or reference noise power $N_3$. Furthermore, the first noise power setting unit 221a and the second noise power setting unit 221b may also set the noise power provided by the system engineer as the reference noise power $N_1$ or reference noise power $N_3$. Moreover, the first noise power setting unit 221a and the second noise power setting unit 221b may also perform simulation and set that simulation result as the reference noise power $N_1$ or reference noise power $N_3$. The first noise power setting unit 221a and the second noise power setting unit 221b need not be connected to the receiver 10 as shown in FIG. 6 except when measuring the noise power of the receiver 10.

It is possible for the first noise power setting unit 221a and the second noise power setting unit 221b to set the reference noise power $N_1$ and reference noise power $N_3$ just once as the initial value, respectively. Furthermore, the first noise power setting unit 221a and second noise power setting unit 221b may periodically set and change the reference noise power $N_1$ and reference noise power $N_3$, or may appropriately set and change them as necessary.

The first noise power setting unit 221a and the second noise power setting unit 221b are connected to the memory 224. The first noise power setting unit 221a and the second noise power setting unit 221b record the set reference noise power $N_1$ and reference noise power $N_3$, respectively, in the memory 224.

The calculation unit 223 calculates the traffic volume based on the plurality of reference noise powers and the measured noise power $N_2$. The calculation unit 223 calculates the traffic volume using the reference noise power $N_1$ and reference noise power $N_3$ as the plurality of reference noise powers. The calculation unit 223 is connected to the memory 224, and reads the reference noise power $N_1$, reference noise power $N_3$, and noise power $N_2$ stored in the memory 224. The calculation unit 223 calculates the traffic volume by substituting the read reference noise power $N_1$, reference noise power $N_3$ and noise power $N_2$ into the following formula (5) or formula (5)'.

$$\frac{\frac{N_2 - N_1}{N_2}}{\frac{N_3 - N_1}{N_3}} \tag{5}$$

$$\frac{1 - \frac{N_1}{N_2}}{1 - \frac{N_1}{N_3}} \tag{5'}$$

Formula (5)' is an equivalent modification of formula (5), and is essentially the same as formula (5). With formula (5) or formula (5)', if the noise power $N_2$ is smaller than the reference noise power $N_3$, the traffic volume is smaller than 1. As the noise power $N_2$ approaches the reference noise power $N_3$, the traffic volume approaches 1. Furthermore, if the noise power $N_2$ becomes greater than the reference noise power $N_3$, the traffic volume exceeds 1. If the reference noise power $N_1$ becomes greater than either the noise power $N_2$ or reference noise power $N_3$, the traffic volume becomes a negative value.

Accordingly, the first noise power setting unit 221a setting the noise power when the traffic volume at the base station 1 is 0 as the reference noise power $N_1$ enables the traffic volume calculated by the calculation unit 223 using formula (5) or formula (5)' to become a positive value. In this case, the calculation unit 223 may multiply the value calculated with formula (5) or formula (5)' by 100, to convert the traffic volume to be expressed as a percentage. The degree of traffic load on the uplink at the base station 1 is apparent from the traffic volume expressed as a percentage. Accordingly, it is preferable that the noise power when the traffic volume is 0 is set as the reference noise power $N_1$.

The calculation unit 223 records the traffic volume in the memory 224. The calculation unit 223 may either directly record the traffic volume calculated by formula (5) or formula (5)' in the memory 224, or as described above, may record the traffic volume converted to be expressed as a percentage in the memory 224. The memory 224 stores the reference noise power $N_1$, reference noise power $N_3$, noise power $N_2$, and traffic volume. The memory 224 is connected to the first noise power setting unit 221a, second noise power setting unit 221b, noise power measurement unit 222, calculation unit 223, and result output unit 225.

This kind of traffic measurement device 220 can be configured from, for example, the computer 30 and measurement device 40 as shown in FIG. 3. The computer 30, together with the measurement device 40, can then realize the traffic measurement device 220 by executing a traffic measurement program to set a plurality of reference noise power $N_1$ and reference noise power $N_3$ at the base station 1, obtain the noise power $N_2$ at the base station 1, and calculate the traffic volume based on the reference noise power $N_1$, reference noise power $N_3$, and noise power $N_2$. It should be noted that this traffic measurement program may be recorded in the storage device 32 or a recording medium, such as a removable medium.

In the case of functioning as the traffic measurement device 220, the measurement device 40, I/F 36, and input/output control unit 33 function as the first noise power setting unit 221a and the second noise power setting unit 221b when setting the measured noise power of the receiver 10 as the reference noise power $N_1$ and reference noise power $N_3$. Furthermore, the input device 35 and input/output control unit 33, or the I/F 36 and input/output control unit 33 function as the first noise power setting unit 221a or second noise power setting unit 221b in the case where the noise power provided by the system engineer is set as the reference noise power $N_1$ and reference noise power $N_3$, or in the case where the simulation result is set as the reference noise power $N_1$ or reference noise power $N_3$.

In this case, the noise power provided by the system engineer or the noise power used in simulation is input from the input device 35 or obtained from an external removable medium by the I/F 36 periodically or at the beginning as an initial value, and then recorded in the memory 34 by the input/output control unit 33. Furthermore, the main control unit 31 and input/output control unit 33 function as the calculation unit 223. Except for these points, the computer 30 and the measurement device 40 function essentially the same as when functioning as the traffic measurement device 20 shown in FIG. 2 so as to realize each unit of the traffic measurement device 220.

(Traffic Measurement Method)

Next, a traffic measurement method using the above traffic measurement device 220 is described. To begin with, the first noise power setting unit 221a sets the reference noise power $N_1$ and records it in the memory 224 (S201). Next, the second noise power setting unit 221b sets the reference noise power $N_3$ and records it in the memory 224 (S202). The noise power measurement unit 222 then measures the noise power $N_2$ and records it in the memory 224 (S203). Subsequently, the calculation unit 223 reads the reference noise power $N_1$, reference noise power $N_3$, and noise power $N_2$ from the memory 224 and substitutes them into formula (5) or formula (5)' so as to calculate the traffic volume. The calculation unit 223 records the calculated traffic volume in the memory 224. Finally, the result output unit 225 reads and outputs the traffic volume from the memory 224 (S204).

It should be noted that steps (S261) through (S203) do not need to be carried out in this order. The traffic measurement device 220 may carry out in the order of the steps (S203), (S202), and (S201), or the order of two steps among the steps (S201) through (S203) may be switched. Furthermore, in the case where the traffic measurement device 220 continuously or periodically measures the traffic volume, the reference noise power $N_1$ and reference noise power $N_3$ may be set each time the traffic volume is measured by repeating step (S201) through step (S203). Alternatively, the traffic measurement device 220 may perform steps (S201) and (S202) only the first time so as to set the reference noise power $N_1$ and reference noise power $N_3$ just once, and from the second time, repeat only steps (S203) and (S204). In other words, the traffic measurement device 220 may calculate the traffic volume by repeatedly measuring only the noise power $N_2$.

(Simulation)

Next, in a similar manner as the first embodiment, measurement of the traffic volume is simulated using the above traffic measurement device 220 and traffic measurement method. The traffic volume measured by the traffic measurement device 220 is also directly proportional to $N/C_{max}$, as the straight line 4 shown in FIG. 5. Thus, with the traffic measurement device 220, it is apparent that an accurate traffic volume is directly proportional to the actual number of users N at the base station 1 can be determined.

Furthermore, by expanding formula (3) with executing some mathematical operations under the assumption that there is no interference from other base stations 1 (interference from other cells), formula (5) and formula (5) can be determined. It is also apparent that formula (5) and formula (5)' represent an accurate traffic volume is directly proportional to the actual number of users N.

With this type of traffic measurement device 220, traffic measurement method, and recording medium in which a traffic measurement program is recorded, the first noise power setting unit 221a and second noise power setting unit 221b set a plurality of the reference noise power $N_1$ and reference noise power $N_3$. The calculation unit 223 calculates the traffic volume based on the plurality of the reference noise power $N_1$ and reference noise power $N_3$, and the noise power $N_2$. Thus, the calculation unit 223 can calculate the traffic volume using the plurality of reference noise powers, which are reference values.

Accordingly, the traffic measurement device 220 can determine the degree of the actual noise power $N_2$ in relation to the plurality of the reference noise power $N_1$ and reference noise power $N_3$, and the traffic volume at the base station 1 can be determined more precisely. Therefore, the traffic measurement device 220 can determine the traffic volume further adequately reflected the traffic load conditions on the uplink of the base station 1, which communicates using CDMA. As a result, the traffic measurement device 220 can further adequately evaluate the traffic load conditions on the uplink of the base station 1.

In addition, the calculation unit 223 can determine an accurate traffic volume that is directly proportional to the actual number of users at the base station 1 by calculating the traffic volume with the formula (5) or formula (5). Thus, through calculation using a simple formula such as formula (5) or formula (5)', the traffic measurement device 220 can determine the traffic volume adequately reflected traffic load conditions on the uplink of the base station 1. It should be noted that the noise power setting unit may set three or more reference noise powers as the plurality of the reference noise powers.

Third Embodiment (Traffic Measurement Device)

The mobile communication system may use a traffic measurement device 320 shown in FIG. 8 as the traffic measurement device. The traffic measurement device 320 is connected to a transmitter 50. The transmitter 50, which is the transmitter of the base station 1, transmits radio signals from the base station 1 to the mobile station 2. The traffic measurement device 320 comprises a transmission power setting unit 321, a transmission power measurement unit 322, a calculation unit 323, a memory 324, and a result output unit 325. It should be noted that the result output unit 325 is essentially the same as the result output unit 25 shown in FIG. 2.

The transmission power setting unit 321 sets a reference transmission power $p_1$, which is a reference value used to measure the traffic volume at the base station 1. The transmission power setting unit 321 can set the transmission power at the base station 1 as the reference transmission power $p_1$ when the traffic volume at the base station 1 is 0. In other words, the transmission power setting unit 321 can set as the reference transmission power $p_1$ the total transmission power at the base station 1 in the state where the base station 1 has not connected any radio links with the mobile stations 2, not one mobile station 2 exists in the cell 3 that is covered by the base station 1, and there is no interference among the mobile stations 2.

The transmitter 50 always transmits on the downlink the common pilot channel (CPICH) that transmits common pilot signal, or broadcast information channel that transmits broadcast information, such as the primary common control physical channel (PCCPCH). Thus, even when the traffic volume at the base station 1 is 0, constant transmission power for the common pilot channel or the broadcast information channel to transmit always exists at the base station 1. Accordingly, the transmission power setting unit 321 can set this constant transmission power as the reference transmission power $p_1$. Therefore the traffic measurement device 320 sets the reference transmission power $p_1$ to a fixed value proper each base station 1.

Furthermore, the transmission power setting unit 321 can set the transmission power at the base station 1 at a previously determined time as the reference transmission power $p_1$. The time may be determined to a certain time or certain time period. For example, the time may be determined to a randomly selected time such as 6:00 AM every morning, a time or period of time when the base station 1 is available, or a time or period of time when the base station 1 is busy or the like.

In addition, the transmission power setting unit 321 can set a maximum transmission power at the base station 1 as the reference transmission power $p_1$. The maximum transmission power at the base station 1 is the maximum capacity of transmission power of the transmitter 50. Therefore the traffic measurement device 320 sets the reference transmission power $p_1$ to a fixed value proper to each base station 1.

The transmission power setting unit 321 is connected to the transmitter 50 as shown in FIG. 8. Thus, the transmission power setting unit 321 can measure the transmission power of the transmitter 50 when the traffic volume is 0, at the previously determined time, and can set that measured transmission power as the reference transmission power $p_1$.

Furthermore, can also set the transmission power provided by the system engineer as the reference transmission power $p_1$. In addition, the transmission power setting unit 321 can simulate the transmission power when the traffic volume is 0, or at the previously determined time, and can set that simulation result as the reference transmission power $p_1$. The transmission power setting unit 321 need not be connected to the transmitter 50 as shown in FIG. 8 except when measuring the transmission power of the transmitter 50.

Furthermore, the transmission power setting unit 321 may also set the reference transmission power $p_1$ just once as the initial value. Furthermore, the transmission power setting unit 321 may also periodically set and change the reference transmission power $p_1$, or may appropriately set and change according to need. The transmission power setting unit 321 is connected to the memory 324. The transmission power setting unit 321 records the set reference transmission power $p_1$ in the memory 324.

The transmission power measurement unit 322 measures a transmission power $p_2$ at the base station 1. The transmission power measurement unit 322 is connected to the transmitter 50 so as to measure the transmission power $p_2$ of the transmitter 50. The transmission power measurement unit 322 measures the total transmission power $p_2$ as the traffic volume at the base station 1 is determined. Consequently, the transmission power measurement unit 322 periodically or continuously measures the transmission power $p_2$ in accordance with when the traffic measurement device 320 periodically or consecutively measures the traffic volume. Furthermore, the transmission power measurement unit 322 appropriately measures the transmission power $p_2$ in accordance with when the traffic measurement device 320 randomly measures the traffic volume.

Furthermore, in the case of simulating traffic volume, the transmission power measurement unit 322 measures the transmission power $p_2$ by estimating the transmission power $p_2$ when simulation of the traffic volume at the base station 1 is desired. In this case, connecting the transmission power measurement unit 322 to the transmitter 50 is not necessary. The transmission power measurement unit 322 is connected to the memory 324, and records the measured transmission power $p_2$ in the memory 324.

The calculation unit 323 calculates the traffic volume based on the reference transmission power $p_1$ and the measured transmission power $p_2$. The calculation unit 323 is connected to the memory 324, and reads the reference transmission power $p_1$ and the transmission power $p_2$ stored in the memory 324. The calculation unit 323 calculates the traffic volume by substituting the read reference transmission power $p_1$ and transmission power $p_2$ into the following formula (6) or formula (6)'.

$$\frac{p_2 - p_1}{p_2} \qquad (6)$$

$$1 - \frac{p_1}{p_2} \qquad (6)'$$

Formula (6)' is an equivalent modification of formula (6), and is essentially the same as formula (6). With formula (6) or formula (6)', if the transmission power $p_2$ becomes greater than the reference transmission power $p_1$, the traffic volume gradually approaches 1. On the contrary, if the transmission power $p_2$ approaches the reference transmission power $p_1$, the traffic volume approaches 0. Furthermore, if the transmission power $p_2$ becomes less than the reference transmission power $p_1$, then the traffic volume becomes a negative value.

Accordingly, the transmission power setting unit 321 setting the transmission power when the traffic volume at the base station 1 is 0 as the reference transmission power $p_i$ enables the traffic volume calculated by the calculation unit 323 using formula (6) or formula (6)', to become a value from 0 to 1. In this case, the calculation unit 323 may also convert the traffic volume to be expressed as a percentage by multiplying the value calculated with formula (6) or formula (6)' by 100. The degree of traffic load on the downlink at the base station 1 is apparent from the traffic volume expressed as a percentage. Accordingly, it is preferable to set the transmission power when the traffic volume is 0 as the reference transmission power $p_1$.

The calculation unit 323 records the traffic volume in the memory 324. The calculation unit 323 may either directly record in the memory 324 the traffic volume calculated by formula (6) or formula (6)', or as described above, may record in the memory 324 the traffic volume that is converted to be expressed as a percentage.

The memory 324 stores the reference transmission power $p_1$, transmission power $p_2$, and traffic volume. The memory 324 is connected to the transmission power setting unit 321, transmission power measurement unit 322, calculation unit 323, and result output unit 325.

This kind of traffic measurement device 320 can be configured from, for example, the computer 30 and measurement device 40 as shown in FIG. 3. The computer 30, together with the measurement device 40, can then realize the traffic measurement device 320 by executing a traffic measurement program to set the reference transmission power $p_1$ at the base station 1, obtain the transmission power $p_2$ at the base station 1, and calculate the traffic volume based on the reference transmission power $p_1$ and the transmission power $p_2$. It should be noted that this traffic measurement program can be recorded in the storage device 32 or a recording medium, such as a removable medium.

In the case of functioning as the traffic measurement device 320, the measurement device 40 is connected to the transmitter 50 so as to measure the transmission power of the transmitter 50. Furthermore, the measurement device 40, I/F 36, and input/output control unit 33 function as the transmission power setting unit 321 when setting the measured transmission power of the transmitter 50 as the reference transmission power $p_1$. The input device 35 and input/output control unit 33, or the I/F 36 and input/output control unit 33 function as the transmission power setting unit 321 in the case where the transmission power provided by the system engineer is set as the reference transmission power $p_1$ or in the case where the simulation result is set as the reference transmission power $p_1$. In this case, the transmission power provided by the system engineer or the transmission power used in simulation is input from the input device 35 or obtained from an external removable medium by the I/F 36 periodically or at the beginning as an initial value, and then recorded in the memory 34 by the input/output control unit 33.

In addition, the measurement device 40, I/F 36, and input/output control unit 33 function as the transmission power measurement unit 322. Furthermore, in the case of simulating the traffic volume, the input device 35 and the input/output control unit 33, or the I/F 36 and the input/output control unit 33 function as the transmission power measurement unit 322. In this case, the transmission power, which is used in simulation and provided by the system engineer, is input from the input device 35 or obtained from an external removable medium by the I/F 36 and then recorded in the memory 34 by the input/output control unit 33. The main control unit 31 and the input/output control unit 33 function as the calculation unit 323. The display device 37 or output device 38 and the input/output control unit 33 function as the result output unit 325.

(Traffic Measurement Method)

Next, a traffic measurement method using the above traffic measurement device 320 is described. As shown in FIG. 9, to begin with, the transmission power setting unit 321 sets the reference transmission power $p_1$ and records it in the memory 324 (S301). Next, the transmission power measurement unit 322 measures the transmission power $p_2$ and records it in the memory 324 (S302). The calculation unit 323 then calculates the traffic volume by reading the reference transmission power $p_1$ and transmission power $p_2$ from the memory 324, substituting them into formula (6) or formula (6)'. The calculation unit 323 records the calculated traffic volume in the memory 324. Finally, the result output unit 325 reads and outputs the traffic volume from the memory 324 (S303).

It should be noted that step (S301) and step (S302) may also occur in reverse order. In other words, first the transmission power measurement unit 322 may measure the transmission power P2, and then the transmission power setting unit 321 may set the reference transmission power $p_1$. Furthermore, in the case where the traffic measurement device 320 continuously or periodically measures the traffic volume, the reference transmission power $p_1$ may also be set each time the traffic volume is measured by repeating step (S301) through step (S303). Alternatively, the traffic measurement device 320 may also set the reference transmission power $p_1$ just once by performing step (S101) only the first time, and from the second time, repeat only steps (S302) and (S303). In other words, the traffic measurement device 320 may calculate the traffic volume by repeatedly measuring only the transmission power $p_2$.

(Simulation)

Next, in a similar manner as the first embodiment, measurement of the traffic volume is simulated using the above traffic measurement device 320 and traffic measurement method. The traffic volume measured by the traffic measurement device 320 is also directly proportional to $N/C_{max}$, as the straight line 4 shown in FIG. 5. Thus, with the traffic measurement device 320, it is apparent that an accurate traffic volume is directly proportional to the actual number of users N at the base station 1 can be determined.

Furthermore, $N/C_{max}$, which is the horizontal axis in FIG. 5 can be calculated from the following formula (7).

$$\frac{N}{C_{max}} = \frac{1-\frac{X_1}{X_2}}{\rho \cdot \left(1-\frac{X_1}{X_3}\right)} = \frac{1-\frac{P_1}{P_2}}{1-\frac{P_1}{P_3}} \quad (7)$$

In formula (7), $\rho$ is the ratio of the transmission power per channel necessary for communication to the maximum transmission power, $X_1$ is the constant transmission power for transmitting the common pilot channel and the broadcast information channel when the traffic volume at the base station 1 is 0, and $X_3$ is the maximum transmission power at the base station 1. It should be noted that $p_3$, which is described in detail in the following fourth embodiment, is one of the reference transmission powers set to a different value from the reference transmission power $p_1$ in the case where the transmission power setting unit sets a plurality of reference transmission powers. Accordingly, the denominator in formula (7) is a value determined by the set reference transmission power $p_1$ and reference transmission power $p_3$. Thus, it is also apparent from this formula (7) that formula (6) or formula (6)', which corresponds to the numerator in formula (7), indicates an accurate traffic volume that is directly proportional to the actual number of users N.

With this type of traffic measurement device 320, traffic measurement method, and recording medium in which a traffic measurement program is recorded, the transmission power setting unit 321 sets the reference transmission power $p_1$, which is a reference value used to measure the traffic volume. The transmission power measurement unit 322 measures the actual transmission power $p_2$ at the base station 1. The calculation unit 323 then calculates the traffic volume based on not only the transmission power $p_2$ actually measured but also the reference transmission power $p_1$, which is a reference value. Thus, the traffic measurement device 320 can determine the degree of the actual transmission power $p_2$ in relation to the reference transmission power $p_1$, and can determine an accurate traffic volume at the base station 1.

Accordingly, the traffic measurement device 320 can determine an accurate traffic volume reflected traffic load conditions on the downlink of the base station 1 that communicates using CDMA, and the traffic load conditions on the downlink of the base station 1 can be adequately evaluated. As a result, using the determined traffic volume, accurate equipment design for the base station 1 in the mobile communication system is possible.

Moreover, the traffic measurement device 320 can easily determine the traffic volume by simply setting the reference transmission power $p_1$ and measuring the actual transmission power $p_2$. Furthermore, the calculation unit 323 can determine an accurate traffic volume that is directly proportional to the actual number of users at the base station 1 by calculating the traffic volume with formula (6) or formula (6)'. Thus, through calculation of a simple formula such as formula (6) or formula (6)', the traffic measurement device 320 can determine the traffic volume reflected traffic load conditions on the downlink of the base station 1.

In addition, the transmission power $p_2$ is a value usually measured at conventional base stations. Therefore, the conventional base stations are usually capable of measuring the transmission power $p_2$. Accordingly, the traffic measurement device 320 can easily determine the traffic volume by using the function currently used at the conventional base stations so as to use the measurable transmission power $p_2$ without providing new function.

As described thus far, the traffic measurement device 320 is capable of easily and precisely estimating the traffic demand and the actual traffic volume on the downlink, which are extremely important in designing the equipment for the base station 1.

Fourth Embodiment (Traffic Measurement Device)

The mobile communication system may use a traffic measurement device 420 shown in FIG. 10 as the traffic measurement device. The traffic measurement device 420 is connected to the transmitter 50. The traffic measurement device 420 comprises a first transmission power setting unit 421a, a second transmission power setting unit 421b, a transmission power measurement unit 422, a calculation unit 423, a memory 424, and a result output unit 425. It should be noted that the transmission power measurement unit 422 and the result output unit 425 are essentially the same as the transmission power measurement unit 322 and the result output unit 325 shown in FIG. 8.

The first transmission power setting unit 421a and second transmission power setting unit 421b function as the transmission power setting unit that sets a plurality of reference transmission powers at the base stations 1, which are reference values used to measure traffic volume. The traffic measurement device 420 sets two reference transmission powers of which one is a reference transmission power $p_1$ and the other is a reference transmission power $p_3$. The first transmission power setting unit 421a sets the reference transmission power $p_1$, and the second transmission power setting unit 421b sets the reference transmission power $p_3$. The only rule for the reference transmission power $p_1$ and reference transmission power $p_3$ is that they are different values.

Accordingly, similar to the transmission power setting unit 321 shown in FIG. 8, the first transmission power setting unit 421a and second transmission power setting unit 421b can set transmission powers different from each other as the reference transmission power $p_1$ and reference transmission power p3 from among the transmission power at the base station 1 when the traffic volume at the base station 1 is 0, the transmission power at the base station 1 at a previously determined time, the maximum transmission power at the base station 1.

However, it is preferable that the reference transmission power $p_3$ is greater than the reference transmission power $p_1$. Thus, it is preferable that the first transmission power setting unit 421a sets as the reference transmission power $p_1$ either the transmission power at the base station 1 when the traffic volume at the base station 1 is 0, or the transmission power at the previously determined time, for example, a time or period of time when the base station 1 is available. On the other hand, it is preferable that the second transmission power setting unit 421b sets as the reference transmission power $p_3$ either the maximum transmission power at the base station 1, or the transmission power at a pre-set time, for example, a time or period of time when the base station 1 is busy.

Furthermore, similar to the transmission power setting unit 321 shown in FIG. 8, the first transmission power setting unit 421a and the second transmission power setting unit 421b, which are connected to the receiver 50, can measure the transmission power of the transmitter 50 and set that measured transmission power as the reference transmission power $p_1$ or reference transmission power $p_3$. Furthermore, the first transmission power setting unit 421a and the second transmission power setting unit 421b may also set the transmission power provided by the system engineer as the reference transmission power $p_1$ or reference transmission power $p_3$. Moreover, the first transmission power setting unit 421a and the second transmission power setting unit 421b may also perform simulation and set that simulation result as the reference transmission power $p_1$ or reference transmission power $p_3$. The first transmission power setting unit 421a and the second transmission power setting unit 421b need not be connected to the transmitter 50 except when measuring the transmission power of the transmitter 50.

It is possible for the first transmission power setting unit 421a and the second transmission power setting unit 421b to set the reference transmission power $p_1$ and reference transmission power $p_3$ just once as the initial value, respectively. Furthermore, the first transmission power setting unit 421a and second transmission power setting unit 421b may periodically set and change the reference transmission power $p_1$ and reference transmission power $p_3$, or may appropriately set and change as necessary. The first transmission power setting unit 421a and the second transmission power setting unit 421b are connected to the memory 424 so as to respectively record the set reference transmission power $p_1$ and reference transmission power $p_3$ in the memory 224.

The calculation unit 423 calculates the traffic volume based on a plurality of reference transmission powers and the measured transmission power $p_2$. The calculation unit 423 calculates the traffic volume using the reference transmission power pi and the reference transmission power $p_3$ as the plurality of reference transmission powers. The calculation unit 423 is connected to the memory 424 and reads the reference transmission power $p_1$, reference transmission power $p_3$ and transmission power $p_2$ stored in the memory 424. The calculation unit 423 calculates the traffic volume by substituting the read reference transmission power $p_1$, reference transmission power $p_3$ and transmission power $p_2$ into the following formula (8) or formula (8)'.

$$\frac{\frac{P_2 - P_1}{P_2}}{\frac{P_3 - P_1}{P_3}} \qquad (8)$$

$$\frac{1 - \frac{P_1}{P_2}}{1 - \frac{P_1}{P_3}} \qquad (8)'$$

Formula (8)' is an equivalent modification of formula (8), and is essentially the same as formula (8). With formula (8) or formula (8)', if the transmission power $p_2$ is smaller than the reference transmission power $p_3$, the traffic volume is smaller than 1. If the transmission power $p_2$ approaches the reference transmission power $p_3$, the traffic volume approaches 1. Furthermore, if the transmission power $p_2$ becomes greater than the reference transmission power $p_3$, the traffic volume exceeds 1. If the reference transmission power $p_1$ becomes greater than either the transmission power $p_2$ or reference transmission power $p_3$, the traffic volume becomes a negative value.

Accordingly, the first transmission power setting unit 421a setting the transmission power when the traffic volume at the base station 1 is 0 as the reference transmission power $p_1$ enables the traffic volume calculated by the calculation unit 421 using formula (8) or formula (8)', to become a positive value. In this case, the calculation unit 423 may multiply the value calculated with formula (8) or formula (8)' by 100, to convert the traffic volume to be expressed as a percentage. The degree of traffic load on the downlink at the base station 1 is apparent from the traffic volume expressed as a percentage. Accordingly, it is preferable that the transmission power when the traffic volume is 0 is set as the reference transmission power $p_1$.

The calculation unit 423 records the traffic volume in the memory 424. The calculation unit 423 may either directly record the traffic volume calculated by formula (8) or formula (8)' in the memory 424, or as described above, may record in the memory 424 the traffic volume converted to be expressed as a percentage. The memory 424 stores the reference transmission power $p_1$, reference transmission power $p_3$, transmission power $p_2$, and traffic volume. The memory 424 is connected to the first transmission power setting unit 421a, second transmission power setting unit 421b, transmission power measurement unit 422, calculation unit 423, and result output unit 425.

This kind of traffic measurement device 420 can be configured from, for example, the computer 30 and measurement device 40 as shown in FIG. 3. The computer 30, together with the measurement device 40, can then realize the traffic measurement device 420 by executing a traffic measurement program to set a plurality of reference transmission power $p_1$, and reference transmission power $p_3$ at the base station 1, obtain the transmission power $p_2$ at the base station 1, and calculate the traffic volume based on the reference transmission power $p_i$, reference transmission power $p_3$, and transmission power $p_2$. It should be noted that this traffic measurement program can be recorded in the storage device 32 or a recording medium, such as a removable medium.

In the case of functioning as the traffic measurement device 420, the measurement device 40 is connected to the transmitter 50 so as to measure the transmission power of the transmitter 50. Furthermore, the measurement device 40, I/F 36, and input/output control unit 33 function as the first transmission power setting unit 421a and the second transmission power setting unit 421b when setting the measured transmission power of the transmitter 50 as the reference transmission power $p_1$ and reference transmission power $p_3$. The input device 35 and input/output control unit 33, or the I/F 36 and input/output control unit 33 function as the first transmission power setting unit 421a and the second transmission power setting unit 421b in the case where the transmission power provided by the system engineer is set as the reference transmission power $p_1$ and reference transmission power $p_3$, or in the case where the simulation result is set as the reference transmission power $p_1$ and reference transmission power $p_3$.

In this case, the transmission power provided by the system engineer or the transmission power used in simulation is input from the input device 35 or obtained from an external removable medium by the I/F 36 periodically or at the beginning as an initial value, and then recorded in the memory 34 by the input/output control unit 33. Furthermore, the main control unit 31 and input/output control unit 33 function as the calculation unit 423. Except for these points, the computer 30 and the measurement device 40 function essentially the same as when functioning as the traffic measurement device 320 shown in FIG. 8 so as to realize each unit of the traffic measurement device 420.

(Traffic Measurement Method)

Next, a traffic measurement method using the above traffic measurement device 420 is described. To begin with, the first transmission power setting unit 421a sets the reference transmission power p1 and records it in the memory 424 (S401). Next, the second transmission power setting unit 421b sets the reference transmission power $p_3$ and records it in the memory 424 (S402). The transmission power measurement unit 422 then measures the transmission power $p_2$ and records it in the memory 424 (S403). Subsequently, the calculation unit 423 calculates the traffic volume by reading the reference transmission power $p_1$, reference transmission power $p_3$, and transmission power $p_2$ from the memory 424, substituting them into formula (8) or formula (8)'. The calculation unit 423 records the calculated traffic volume in the memory 424. Finally, the result output unit 425 reads and outputs the traffic volume from the memory 424 (S404).

It should be noted that steps (S401) through (S403) do not need to be carried out in this order. The traffic measurement device 420 may carry out in the order of the steps (S403), (S402), and (S401), or the order of two steps among the steps (S401) through (S403) may be switched. Furthermore, in the case where the traffic measurement device 420 continuously or periodically measures the traffic volume, the reference transmission power pi and reference transmission power $p_3$ may also be set each time the traffic volume is measured by repeating steps (S401) through (S403). Alternatively, the traffic measurement device 420 may perform steps (S401) and (S402) only the first time so as to set the reference transmission power $p_1$ and reference transmission power $p_3$ just once, and from the second time, repeat only steps (S403) and (S404). In other words, the traffic measurement device 420 may calculate the traffic volume by repeatedly measuring only the transmission power $p_2$.

(Simulation)

Next, in a similar manner as in the first embodiment, measurement of the traffic volume is simulated using the above traffic measurement device 420 and traffic measurement method. The traffic volume measured by the traffic measurement device 420 is also directly proportional to $N/C_{max}$, as the straight line 4 shown in FIG. 5. Thus, with the traffic measurement device 420, it is apparent that an accurate traffic volume is directly proportional to the actual number of users N at the base station 1 can be determined. Furthermore, it is also apparent from formula (7) that formula (8) and formula (8)' represent an accurate traffic volume is directly proportional to the actual number of users N.

With this type of traffic measurement device 420, traffic measurement method, and recording medium on which a traffic measurement program is recorded, the first transmission power setting unit 421a and second transmission power setting unit 421b set the plurality of the reference transmission power $p_1$ and reference transmission power $p_3$. The calculation unit 423 calculates the traffic volume based on the plurality of the reference transmission power $p_1$ and reference transmission power $p_3$, and the transmission power $p_2$. Thus, the calculation unit 423 can calculate the traffic volume using the plurality of reference transmission powers, which are reference values.

Accordingly, the traffic measurement device 420 can determine the degree of the actual transmission power $p_2$ in relation to the plurality of the reference transmission power $p_1$ and reference transmission power $p_3$, and the traffic volume at the base station 1 can be determined more precisely. Therefore, the traffic measurement device 420 can determine the traffic volume further adequately reflected traffic load conditions on the downlink of the base station 1, which communicates using CDMA. As a result, the traffic measurement device 420 can further adequately evaluate the traffic load conditions on the downlink of the base station 1.

In addition, the calculation unit 423 can determine an accurate traffic volume is directly proportional to the actual number of users at the base station 1 by calculating the traffic volume with formula (8) or formula (8)'. Thus, through calculation using a simple formula such as formula (8) or formula (8)', the traffic measurement device 420 can determine the traffic volume with the adequately reflected traffic load conditions on the downlink of the base station 1. It should be noted that the transmission power setting unit may set three or more reference transmission powers as the plurality of the reference transmission powers.

The present invention is not limited to the above first through fourth embodiments, but can incorporate various modifications.

What is claimed is:

1. A traffic measurement device comprising:

a noise power setting unit configured to set two reference noise powers, which are reference values used to measure a traffic volume at a base station that connects a radio link and communicates with a mobile station using Code Division Multiple Access;

a noise power measurement unit configured to measure a noise power at the base station; and a calculation unit configured to calculate the traffic volume based on the two reference noise powers and the measured noise power, wherein the noise power setting unit sets as one of the two reference noise powers a noise power at the base station when the traffic volume at the base station is 0; and the noise power setting unit sets as the other of the two reference noise powers a noise power at the base station at a previously determined time, wherein the two reference noise powers are different from each other.

2. The traffic measurement device according to claim 1, wherein the calculation unit calculates the traffic volume by substituting one of the two reference noise powers for $N_1$, the other one of the two reference noise power for $N_3$, and the measured noise power for $N_2$ into a following formula:

$$\frac{\frac{N_2 - N_1}{N_2}}{\frac{N_3 - N_1}{N_3}}.$$

3. A traffic measurement device comprising:

a transmission power setting unit configured to set two reference transmission powers, which are reference values used to measure a traffic volume at a base station that connects a radio link and communicates with a mobile station using Code Division Multiple Access;

a transmission power measurement unit configured to measure a transmission power at the base station; and a calculation unit configured to calculate the traffic volume based on the two reference transmission powers and the measured transmission power, wherein the transmission power setting unit sets as one of the two reference transmission powers a transmission power at the base station when the traffic volume at the base station is 0; and the transmission power setting unit sets as the other of the two reference transmission powers a transmission power at the base station at a first previously determined time, wherein the two reference transmission powers are different from each other.

4. The traffic measurement device according to claim 3, wherein the calculation unit calculates the traffic volume by substituting one of the two reference transmission powers for $p_1$, the other of the two reference transmission powers for $p_3$, and the measured transmission power for $p_2$ into a following formula:

$$\frac{\frac{P_2 - P_1}{P_2}}{\frac{P_3 - P_1}{P_3}}.$$

5. A traffic measurement method comprising:
setting two reference noise powers, which are reference values used to measure a traffic volume at a base station that connects a radio link and communicates with a mobile station using Code Division Multiple Access;
measuring a noise power at the base station;
calculating the traffic volume based on the two reference noise powers and the measured noise power;
setting, as one of the two reference noise powers, a noise power at the base station when the traffic volume at the base station is 0; and
setting, as the other of the two reference noise powers, a noise power at the base station at a first previously determined time,
wherein the two reference noise powers are different from each other.

6. A traffic measurement method comprising:
setting two reference transmission powers, which are reference values used to measure a traffic volume at a base station that connects a radio link and communicates with a mobile station using Code Division Multiple Access;
measuring a transmission power at the base station;
and calculating the traffic volume based on the two reference transmission powers and the measured transmission power;
setting, as one of the two reference transmission powers, a transmission power at the base station when the traffic volume at the base station is 0; and
setting, as the other of the two reference transmission powers, a transmission power at the base station at a first previously determined time,
wherein the two reference transmission powers are different from each other.

7. A traffic measurement device comprising:
a noise power setting unit configured to set two reference noise powers, which are reference values used to measure a traffic volume at a base station that connects a radio link and communicates with a mobile station using Code Division Multiple Access;
a noise power measurement unit configured to measure a noise power at the base station; and
a calculation unit configured to calculate the traffic volume based on the two reference noise powers and the measured noise power, wherein
the noise power setting unit sets as one of the two reference noise powers a noise power at the base station at a previously determined time; and
the noise power setting unit sets as the other of the two reference noise powers a noise power at the base station when the traffic volume at the base station is an acceptable upper limit,
wherein the two reference noise powers are different from each other.

8. A traffic measurement device comprising:
a noise power setting unit configured to set two reference noise powers, which are reference values used to measure a traffic volume at a base station that connects a radio link and communicates with a mobile station using Code Division Multiple Access;
a noise power measurement unit configured to measure a noise power at the base station; and
a calculation unit configured to calculate the traffic volume based on the two reference noise powers and the measured noise power, wherein
the noise power setting unit sets as one of the two reference noise powers a noise power at the base station at a first previously determined time; and
the noise power setting unit sets as the other of the two reference noise powers a noise power at the base station at a second previously determined time,
wherein the two reference noise powers are different from each other.

9. A traffic measurement device comprising:
a transmission power setting unit configured to set two reference transmission powers, which are reference values used to measure a traffic volume at a base station that connects a radio link and communicates with a mobile station using Code Division Multiple Access;
a transmission power measurement unit configured to measure a transmission power at the base station; and
a calculation unit configured to calculate the traffic volume based on the two reference transmission powers and the measured transmission power, wherein
the transmission power setting unit sets as one of the two reference transmission powers a transmission power at the base station at a previously determined time; and
the transmission power setting unit sets as the other of the two reference transmission powers a maximum transmission power at the base station,
wherein the two reference transmission powers are different from each other.

10. A traffic measurement device comprising:
a transmission power setting unit configured to set two reference transmission powers, which are reference values used to measure a traffic volume at a base station that connects a radio link and communicates with a mobile station using Code Division Multiple Access;
a transmission power measurement unit configured to measure a transmission power at the base station; and
a calculation unit configured to calculate the traffic volume based on the two reference transmission powers and the measured transmission power, wherein
the transmission power setting unit sets as one of the two reference transmission powers a transmission power at the base station at a first previously determined time; and
the transmission power setting unit sets as the other of the two reference transmission powers a transmission power at the base station at a second previously determined time,
wherein the two reference transmission powers are different from each other.

11. A traffic measurement method comprising:
setting two reference noise powers, which are reference values used to measure a traffic volume at a base station that connects a radio link and communicates with a mobile station using Code Division Multiple Access;
measuring a noise power at the base station;
calculating the traffic volume based on the two reference noise powers and the measured noise power;
setting, as one of the two reference noise powers, a noise power at the base station at a previously determined time; and
setting, as the other of the two reference noise powers, a noise power at the base station when the traffic volume at the base station is an acceptable upper limit, wherein the two reference noise powers are different from each other.

12. A traffic measurement method comprising:

setting two reference noise powers, which are reference values used to measure a traffic volume at a base station that connects a radio link and communicates with a mobile station using Code Division Multiple Access;

measuring a noise power at the base station;

calculating the traffic volume based on the two reference noise powers and the measured noise power;

setting, as one of the two reference noise powers, a noise power at the base station at a first previously determined time; and setting, as the other of the two reference noise powers, either a noise power at the base station at a second previously determined time, wherein the two reference noise powers are different from each other.

13. A traffic measurement method comprising:

setting two reference transmission powers, which are reference values used to measure a traffic volume at a base station that connects a radio link and communicates with a mobile station using Code Division Multiple Access;

measuring a transmission power at the base station;

calculating the traffic volume based on the two reference transmission powers and the measured transmission power;

setting, as one of the two reference transmission powers, a transmission power at the base station at a previously determined time; and setting, as the other of the two reference transmission powers, a maximum transmission power at the base station, wherein the two reference transmission powers are different from each other.

14. A traffic measurement method comprising:

setting two reference transmission powers, which are reference values used to measure a traffic volume at a base station that connects a radio link and communicates with a mobile station using Code Division Multiple Access;

measuring a transmission power at the base station;

calculating the traffic volume based on the two reference transmission powers and the measured transmission power;

setting, as one of the two reference transmission powers, a transmission power at the base station at a first previously determined time; and setting, as the other of the two reference transmission powers, either a transmission power at the base station at a second previously determined time, wherein the two reference transmission powers are different from each other.

* * * * *